July 14, 1931.  A. J. FLECK  1,814,624
ACOUSTIC DEVICE
Filed Dec. 15, 1928   3 Sheets-Sheet 1

Inventor
ABRAHAM J. FLECK
By his Attorney

July 14, 1931. A. J. FLECK 1,814,624
ACOUSTIC DEVICE
Filed Dec. 15, 1928 3 Sheets-Sheet 2

Inventor
ABRAHAM J. FLECK.
By his Attorney
Howard W. Dix

Inventor
ABRAHAM J. FLECK.
By his Attorney

Patented July 14, 1931

1,814,624

UNITED STATES PATENT OFFICE

ABRAHAM J. FLECK, OF BRADLEY BEACH, NEW JERSEY

ACOUSTIC DEVICE

Application filed December 15, 1928. Serial No. 326,262.

This invention relates to sound amplifiers and more particularly to an amplifier of the tuned diffusion sound propagating type.

While the term "tuned diffusion sound propagating type" is herein employed, it is to be understood that this term is to be construed broadly so that it will include the various ways of amplifying sound waves, as for instance, diffusion and reflection, or resounding, or echoing, or re-echoing, or reverberating or the like. Whatever may be the action to produce the amplification, it is desired to be clearly understood that a very successful, complete and satisfactory amplification or reproduction is obtained by the embodiment of the invention herein set forth.

Most of the amplifying apparatus used heretofore comprises devices which receive the input vibrations from a vibrating member and control and direct their expanding areas from a central starting point outwardly to the periphery of the amplifier. The air compressions and rarefactions engendered by the vibrations are reflected from side to side or back and forth in the acoustical apparatus. By the suppression of multi-directional expansion to a more or less directional one, as along oblique, diverging or diagonal lines, the character of the sound wave is altered and the quality of tone materially affected.

The major object of the present invention is to provide a device in which sound waves are propagated without suppressing, directing or changing the natural multi-directional expansion of the sound waves.

It is known that sound waves propagated by a diaphragm lying in a flat plane have a minimum of distortion; however, such devices likewise have a minimum of amplifying power, and the distortionless effect obtains for only a relatively small area.

It has been found that if instead of imparting vibrations directly to a diaphragm, the vibrations are impressed through the medium of a member bridged across an opening approximately the area of, or a little larger than the area of the undistorted sound waves, the transferred vibrations will then create undistorted and amplified sound waves in the larger area of the diaphragm to which they have been transferred. The maximal amplification with minimal distortion may be secured by providing the diaphragm with suitable sound openings which permit the emission of sound waves before they partake too much of the shape or plane of the diaphragm so as to become directional or distorted.

In the preferred embodiment of the invention, sound waves are propagated with a diaphragm lying in a substantially flat or single plane. This diaphragm comprises a portion of a resounding chamber. The opposite face of the chamber is so positioned with respect to the diaphragm as to permit the reflected waves to blend or synchronize with the original waves and hence, amplify it with clarity and efficient sonorousness. As will be disclosed more fully hereinafter, by carefully constructing the amplifying casing depth, fullness of tone may be secured with faithful reproduction.

Broadly considered, the amplifying member, or loud speaker comprises a diaphragm, to which is attached, by means of a bridged member, a suitable vibrating member, such as the driving rod of an electromagnet which is excited in accordance with intensity of sound waves which are to be amplified. The vibrations imparted to the bridge are then transferred to the diaphragm over a wider area than that to which the vibrations were originally impressed. Associated with the diaphragm is a second, substantially flat member, which is joined thereto by a wall, so that the whole preferably constitutes a box or casing.

In constructing the unit, a relatively wide range of materials may be used. The bridge may be constructed of a hard, seasoned wood of sufficient strength and rigidity to permit the transmission of vibrations without danger of breakage. Secured to the bridge are arm members which extend outwardly and downwardly therefrom, so as to space the bridge from the diaphragm for reasons to appear more fully hereinafter. The material for the bridge and arms may be of any suitable wood or light metal of a vibratory nature, such as aluminum or its alloys. Those materials should be chosen which have very little frequency response of their own.

For the diaphragm it is preferred to use hard seasoned wood such as is used in violins and the like. However, the diaphragm may also be constructed from thin metal alloys, mica or any other material having the requisite vibration characteristics. The diaphragm should be made as thin as is commensurate with the resiliency required to maintain its plane and to withstand vibration stresses.

The back portion of the chamber may be made of the same kind of material as the diaphragm, and preferably is provided with strips of material secured to it and extending diagonally across its external area. These strips may be cemented or otherwise suitably secured to the back.

The sides of the casing are made up of a material which is preferably of non-vibrating characteristics. This may comprise a heavy wood edged with a thick border or gasket of lead, or the border or sides may consist of metals of a non-vibratory nature, as bakelite, hard rubber or the like. There are a wide number of substances which may be employed to subserve the function of this member, that is to say, to provide a base for the diaphragm which will check the path of the vibrations, so as to retain the vibrations within the diaphragm. Thus the mechanical transmission of the vibrations is checked at the border of the diaphragm.

In constructing the preferred device, the sound apertures in the diaphragm, bottom and sides, are preferably so positioned that each aperture is opposite a solid surface, that is to say, the apertures are unaligned with respect to each other. This type of construction while insuring substantial amplification, precludes excessive reverberation of sounds, and substantially eliminates consequent distortion and reduction of quality of the emanating waves.

In order to render the invention more comprehensible, there are shown preferred embodiments of it in the accompanying drawings. In these drawings the same reference numerals refer to similar parts throughout the several views, of which Fig. 1 is a front view of an amplifier embodying the invention;

Figure 1:
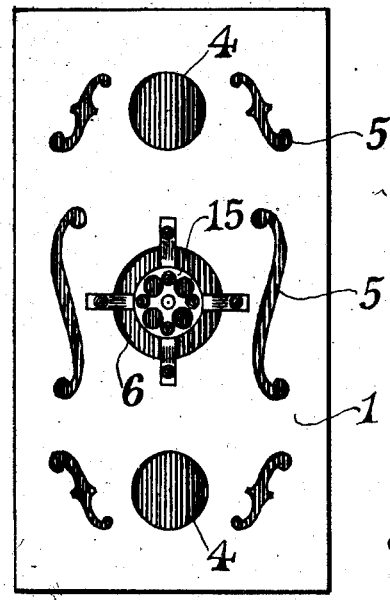
Figure 3:
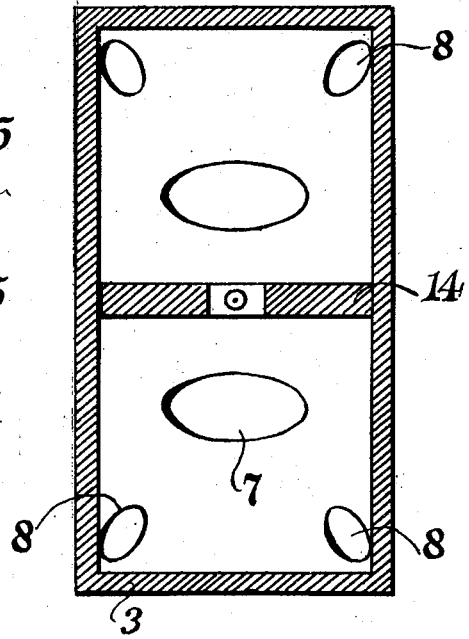
Fig. 3 is a longitudinal section of the device shown in Fig. 1.
Figure 2:
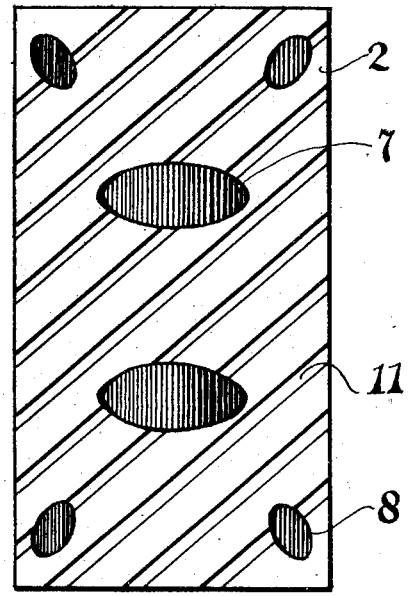
Fig. 2 is a rear view thereof.
Figure 4:
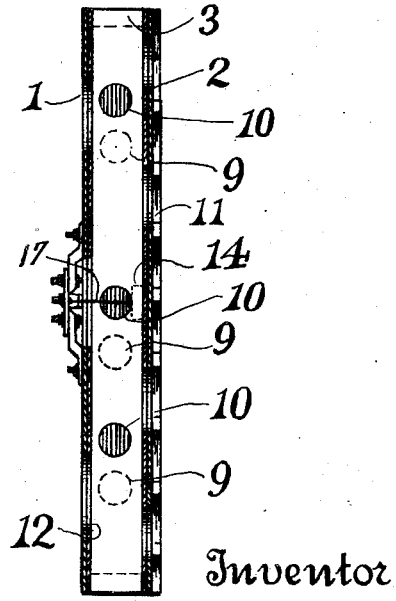
Fig. 4 is a side view illustrating the juxtaposition of the sound openings in the sides of the casing.
Figure 5:
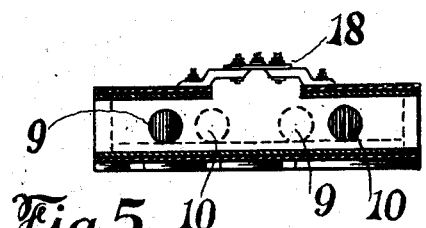
Fig. 5 is an end view similar to Fig. 4 illustrating the principle of unaligned openings.

Referring to the drawings, and particularly to Figs. 1 to 6, the novel amplifying device comprises a casing having a diaphragm top 1, a bottom section 2, and side walls 3. The casing may be made up in any desired shape, the rectangular form shown in the drawings being merely typical and preferable. The top, or diaphragm, as indicated hereinbefore, may comprise a suitable substance having the desired characteristics of strength, thinness and vibration. This member is preferably formed with a plurality of sound openings to permit the emission of amplified sound waves. As shown these may be of any desired configuration, such as the circular holes 4, or the F-holes 5. The diaphragm is preferably provided with an enlarged central aperture 6 (see Figs. 1 and 5). It will be understood that a suitable frame or guard or covering may be placed over the diaphragm if desired for purposes of protecting or covering the same.

The bottom section, which is preferably composed of the described materials, in a manner similar to the construction of the diaphragm, is formed with a plurality of openings 7 and 8. The larger openings 7, it will be noted, are positioned near the central portion of the casing where the larger volume of sound obtains. It will be observed on the inspection of Figs. 1 and 2, that the openings in the bottom section are unaligned with the apertures in the top or diaphragm, so that no straight uniplanar free path of the vibrations through the two members is permitted. These openings, as has been indicated hereinbefore, may be of any desired shape or configuration, provided only, however, that their positions conform to the requirements noted. Preferably the bottom section is provided with suitable strips 11 which aid in providing a proper sound propagating bottom section. Suitable gaskets 12 of lead felt or any other suitable non-vibratable material are introduced between the bottom section 2 and the frame 3 and between the frame 3 and the diaphragm 1 to prevent the mechanical transmission of the sound waves away from the diaphragm.

The various sizes and positions of the openings are important in aiding in the proper tuning of the instrument, and it has been found desirable to usually locate the openings so that they are not opposite each other.

In many instances it is found that there is a range in the proper depth or thickness, or distance between the diaphragm and the bottom of the speaker where the reflected echo is of maximum amplification, and it is found that this distance is contingent in most instances on the area of the diaphragm and the stress of the vibrations.

The sides of the casing are likewise provided with a plurality of openings 9 and 10. As observed hereinbefore, these are so positioned that the prolongation of the central axis of each aperture and the parallel projections from the peripheries thereof do not intercept similar projections of the apertures on the opposed sides. As noted above, this construction insures maximum amplification while preventing phase displacement of the sound waves and resulting distortion.

The bottom member 2 may be provided with a bar 14 for supporting the vibrating means, when such unit is mounted within the casing. This vibrating means may be of any suitable construction including electromagnetic and electrodynamic units.

Figure 6:
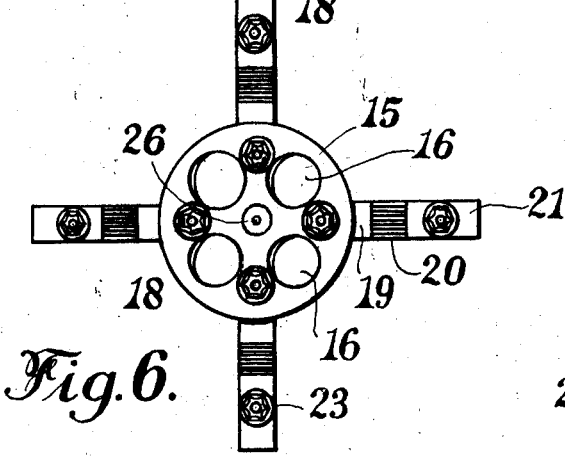
Fig. 6 is an enlarged detail of the vibration transmitting device.
Figure 7:
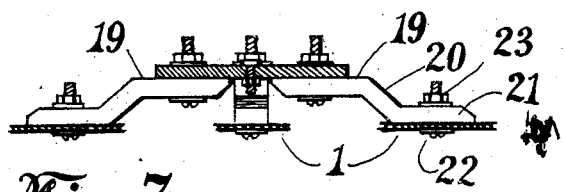
Fig. 7 is a cross-sectional view of the device shown in Fig. 6.

As intimated hereinbefore, vibrations are adapted to be imparted to the diaphragm over a larger area thereof than that of the initially vibrated member. This may be accomplished by utilizing a number of specific mechanisms. One of these is shown in Figs. 1, 6 and 7. This comprises a bridge 15, which, preferably is in circular or disk-like form, although any desired shape may be employed. This member, as has been noted, may be constructed of a hard seasoned wood, or a suitable metal. Preferably the member is bored or cut out to present a plurality of apertures 16. These, it will be observed, permit the free passage of amplified waves from the interior of the casing to the external medium. The member is centrally bored, or threaded to receive a rod 17, which is adapted to be attached to the source of vibrations, as for example, the driving rod of an electromagnet.

In accordance with the principles of the invention, the vibrations imparted to the bridge are transferred to the diaphragm but over a wider area thereof. This may be accomplished by providing the bridge with laterally extending members adapted for rigid attachment to the diaphragm. In the preferred modification, the bridge is raised above the plane of the diaphragm so as to permit a larger space for the egress of propagated waves. In addition, this spacing of the bridge, it is thought, enhances the clarity of reproduction. Vibrations traveling from the bridge to the diaphragm simultaneously institute sound waves from a plurality of spaced points, giving at once an increased volume, and even reproduction.

To permit this attachment of the bridge, and at the same time to provide the spaced relationship described above, the offset members 18 are employed. As shown, particularly in Fig. 7, these comprise a flat portion 19, and integral downwardly extensions 20, and a terminal foot 21. The top and foot sections are bored to permit the passage of securing means illustrated conventionally by the bolts and nuts 22 and 23. The offset shape of these arms allows the desired spaced relationship between the diaphragm and the bridge, and at the same time provide a suitable path for the transmission of vibrations from the bridge to a wider area of the diaphragm.

Figure 9:
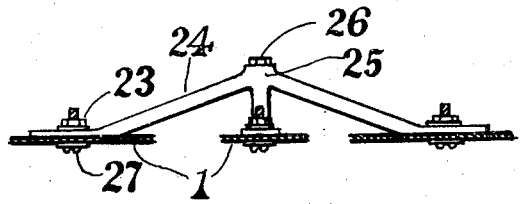
Figs. 8 and 9 are plan and elevation views, respectively, of a modified form of vibration transmitter.
Figure 8:
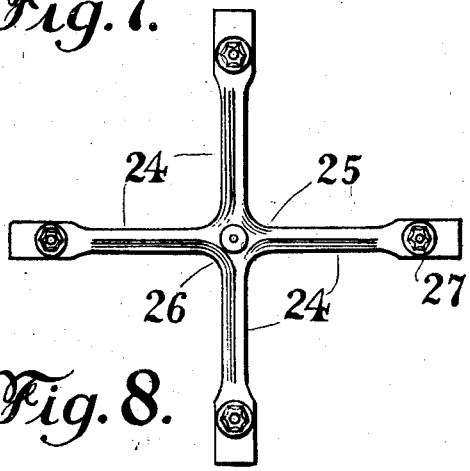

While the vibration transmitter, which has been described, comprises a plurality of separate members which are adapted to be secured together, it will be appreciated that they may initially be made up as a single unitary device. Such a structure is shown in Figs. 8 and 9. This comprises a member having a plurality of radial arms 24, extending upwardly and converging at a central portion 25. The central portion, which it will be noted, is spaced above the free ends of the radial arms, is provided with a means 26 through which the transmitter may be associated with a vibratory element. The lower ends of the arms are extended angularly, so that upon assemblance, they lie in the same plane as the diaphragm. These free ends are suitably apertured so as to receive the securing means 27. As shown, the radial arms are constricted between the central portions and their free ends so as to permit a wide spacing therebetween for the passage of resonated waves to the exterior medium.

Figure 10:
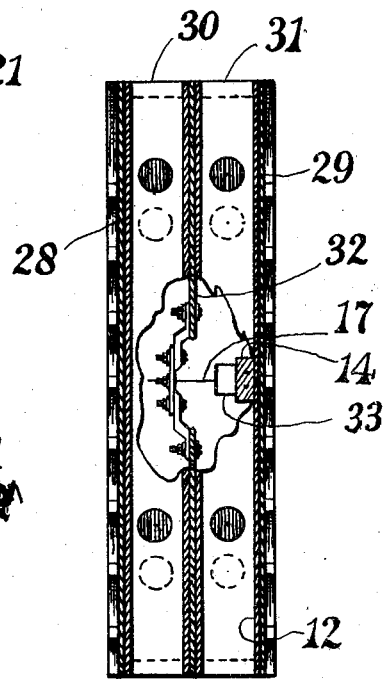
Fig. 10 is a modification of the device in which a single vibrating means is associated with a plurality of casings.

Thus far, there has been described an embodiment which includes a single resonating chamber. It will be observed that the invention is by no means limited to such a structure. If it is desired to obtain increased volume for a given available space, the vibration transmitter may be associated with a double casing. Such a structure is shown in Fig. 10. This comprises essentially a casing having two side members 28, 29, end members 30, 31, and a single diaphragm 32 centrally positioned therein. The diaphragm may be constructed similarly to that hereinbefore described, and having the novel transmitter attached thereto. It will be observed in this case that the vibrations of the diaphragm, in both directions, are amplified by impressed synchronized waves, and the resulting amplified waves transmitted to the exterior medium without substantial distortion or impairment of quality. If desired, the vibration imparting device 33 may be mounted within one of the casings upon the bar 14.

Figure 11:
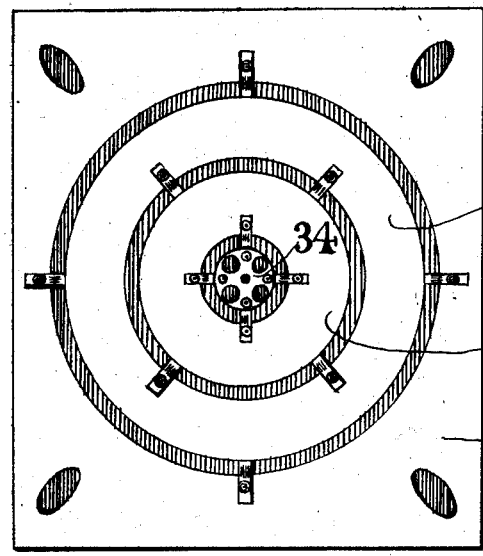
Fig. 11 is a further modification embodying a multiple bridge vibration transmitter.
Figure 12:
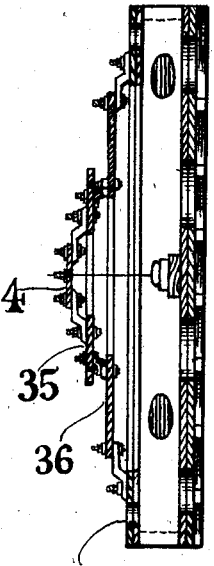
Fig. 12 is a side view partially in section of the device shown in Fig. 11.

Similarly, the advantages of the invention may be accentuated by using a multiple construction as is shown in Figs. 11 and 12. With this construction, the vibrations from the vibrating member are transmitted to the diaphragm over a very wide area. It will be noted that the legs of the upper bridge 34 are connected to an intermediate bridge 35, which, in turn is attached to the lower bridge 36 which is attached to diaphragm 37. The intermediate bridge is attached to the lower bridge at points radially spaced from the points of attachment between the upper and intermediate bridges. This structure is beneficial in promoting a more uniform distribution of stresses and resulting vibrations of the several members, by providing, in fact a uniplanar vibrating member whose entire surface is directly responsive to the imposed vibrations.

Figure 13:
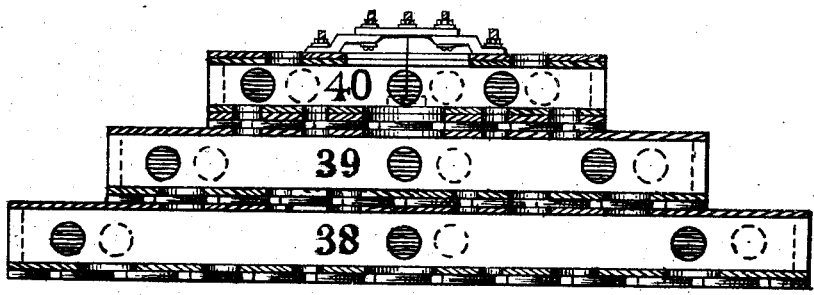
Fig. 13 is a cross-sectional elevation of a further modification embodying a plurality of superimposed casings.

If desired, the volume of amplified sound may be further appreciably increased, by associating with a single vibration transmitter a plurality of propagation chambers. As a typical example, this may take the form shown in Fig. 13. This comprises a plurality of pyramided chambers 38, 39 and 40, each of which is constructed according to the general principles described above. The upper chamber 40 is provided with a vibrating bridge associated in responsive relation to a source of vibrations. The intermediate chamber abuts the upper chamber so that the apertures in its top section register with those in the bottom portion of chamber 40. Similarly the lowermost chamber abuts the intermediate chamber so that the apertures in their contiguous faces are in registration. It will be seen that vibration of the diaphragm of the upper chamber will cause compressions and rarefaction of the air in the several chambers below, and that the normal placement of the sound openings in the several chambers are so balanced that the amplified sound is emitted with full clarity.

It will now be seen that there has been provided an improved amplifier which is adapted to amplify sound waves while allowing for free, natural, multi-directional diffusion and/or refraction. By the novel construction of the vibrator in conjunction with the other parts, maximum use is made of the capacity of the chamber without introducing any undesirable results.

It will also be noted that the preferred construction herein disclosed provides an independently operated diaphragm in that the diaphragm is not subject to vibrations mechanically transmitted from the board nor the frame. Likewise the vibrations of the diaphragm are not mechanically transmitted to the reflecting board nor to the frame. The insulation against mechanical transmission of the vibrations is preferably accomplished by insulating the diaphragm from the remainder of the speaker by the lead or other type gaskets as described above. The diaphragm, however, cooperates with the reflecting board, and the vibrations transmitted through the air, and thus the whole assembly or unit produces a most satisfactory and true reproduction of the sound. It will further be noted from the preferred construction herein that the vibrations produced by the driving unit, which is usually electrical, are applied to the diaphragm at a point or a plurality of points which are spaced apart or away from the actual center of the diaphragm. It will also be noted that in the preferred construction the walls of the chamber are usually constructed so that they are in parallel relation to each other. Thus the diaphragm is usually parallel to the bottom and some of the sound waves may be directly reflected back and issue through the openings while other of the sound waves issue from the chamber by reason of their refraction and diffusion.

While certain modifications have been described in detail, it is to be understood that these are given merely by way of example, and since the underlying principles may be incorporated in other specific mechanisms, it is not intended to be restricted to the ones herein shown and described, except as such restrictions are clearly imposed by the appended claims.

What is claimed is:

1. A sound amplifying device comprising an apertured diaphragm, an apertured backing member with the diaphragm, a substantially non-vibratory member connecting the diaphragm and backing member and forming therewith a sound propagating chamber, the apertures in said diaphragm and backing member being in unaligned relationship.

2. A sound amplifying device including a sound propagating chamber having apertured top and bottom sections, the apertures in the sections being in unaligned relationship, a bridge member secured to the top section, and means to impart vibrations to the bridge.

3. A sound amplifying apparatus comprising a sound propagating chamber including top, bottom and side sections, each of which is provided with a plurality of apertures, the apertures presenting a non-uniplanar path through any two apertures.

4. A sound amplifying device including a sound propagating chamber having top and bottom apertured sections, the apertures in each section being opposite a non-apertured portion of the other section, and means to impart vibrations corresponding to sound waves to one of the sections.

5. A sound amplifying apparatus comprising a sound propagating chamber constituting a casing including top, bottom and side sections, the top central section being formed with a large aperture, a vibration transferring member securely attached to the top section and bridging the aperture, and means secured to the transfer member to impart vibrations thereto.

6. A sound amplifying apparatus including a sound propagating chamber including a top vibratable section which is formed with an aperture, a diaphragm disc in the plane of the aperture and secured to the top section, and means to impart vibrations to the disc.

7. A sound amplifying apparatus comprising a sound propagating chamber having a top section formed with an aperture, an apertured disc attached to the section and in substantial alignment with the aperture, and means to attach the disc to the top section, whereby a free path is permitted through the apertures in said disc and top section.

8. A sound amplifying apparatus comprising a vibrating means, a disc connected to said means, a sound propagating device comprising a plurality of superimposed resounding chambers, and means to mount the vibrating means and disc within the chambers.

9. A sound amplifying device comprising a sound propagating chamber having apertured top, side and bottom sections, each section being formed with apertures which are offset with respect to the apertures in another section, a vibration transferring bridge member attached to the top section and formed with a central aperture; a second vibration transferring bridge secured to the first bridge and formed with a central aperture, whereby a free path is provided through the apertures in the bridges and top sections; and means to impart vibrations to the last named vibration transferring bridge.

10. A sound amplifying device comprising a sound propagating chamber, including top, side and bottom apertured sections, each of which is formed with apertures which are non-aligned with the apertures in another section; a vibrating means spaced above the top section, and means to transmit vibrations from the vibrating means to the top section.

11. A sound amplifying device comprising a sound propagating chamber having an opening in the top section and a vibration means attached to the section and bridged across and spaced from the opening.

12. A sound amplifying device comprising a sound propagating chamber having an opening in the top section and a vibration means attached to the section and bridged across the opening.

13. A sound amplifying device comprising a plurality of superimposed resonating chambers, each chamber having apertured top, bottom and side sections, the apertures in the top of one section being aligned with the apertures in the bottom of the section above; the apertures in the top, bottom and sides of each section being unaligned; and means to impart vibrations to the top of one of the sections.

14. A vibration transferring bridge of the class described comprising a plate having a plurality of apertures therein to permit the passage of sound waves, and a plurality of rigid arms attached to the plate and extending laterally therefrom.

15. In a sound reproducer a vibrating member, a reflecting board, a supporting frame mounted between said vibratory member and said reflecting board and associated with each, and vibrationless means interposed between said vibrating member and said frame to prevent the mechanical transfer of sound vibrations.

16. In a sound reproducer, a vibrating diaphragm, a sound reflecting board associated with said diaphragm, insulated means between said diaphragm and said board for preventing the mechanical transmission of vibrations from one to the other, and a bridge member associated with said diaphragm and affixed thereto at a plurality of points spaced apart from the center of said diaphragm for transmitting to said diaphragm vibrations produced by a suitable driving unit.

17. A vibration transferring member of the class described comprising a single member having a central section, a plurality of rigid radially extending, spaced arms, a vibrating member, means to attach the central section to said vibrating member, and means to attach the ends of the arms to a diaphragm at points away from the center of said diaphragm.

18. A sound amplifying device comprising an apertured diaphragm, an apertured backing member with the diaphragm, a substantially non-vibratory member connecting the diaphragm and backing member and forming therewith a sound propagating chamber.

This specification signed this 14th day of December, 1928.

ABRAHAM J. FLECK.